United States Patent [19]

Corfitsen

[11] Patent Number: 5,758,701

[45] Date of Patent: Jun. 2, 1998

[54] ARRANGEMENT FOR DOCKING AT AUTOMATIC FUELLING OF VEHICLES

[75] Inventor: Sten Corfitsen, Lidingö, Sweden

[73] Assignee: Autofill Patent AB, Stockholm, Sweden

[21] Appl. No.: 776,886

[22] PCT Filed: Aug. 4, 1995

[86] PCT No.: PCT/SE95/00909

§ 371 Date: Feb. 10, 1997

§ 102(e) Date: Feb. 10, 1997

[87] PCT Pub. No.: WO96/05136

PCT Pub. Date: Feb. 22, 1996

[30] Foreign Application Priority Data

Aug. 11, 1994 [SE] Sweden .................. 9402690

[51] Int. Cl.$^6$ ....................................... B67D 5/08
[52] U.S. Cl. .................... 141/386; 141/98; 141/382; 141/388; 901/11; 901/16; 901/45
[58] Field of Search ........................ 141/98, 231, 279, 141/312, 346, 382, 383, 386, 387, 388; 901/11, 16, 45

[56] References Cited

U.S. PATENT DOCUMENTS

| Re. 31,882 | 5/1985 | Moskovich . | |
|---|---|---|---|
| 1,337,558 | 4/1920 | King | 141/382 |
| 1,721,726 | 7/1929 | Boe | 141/382 |
| 2,192,736 | 3/1940 | Earl | 141/388 |
| 3,233,641 | 2/1966 | Ehlers | 141/387 |
| 3,527,268 | 9/1970 | Ginsburgh | 141/98 |
| 3,976,100 | 8/1976 | Souslin | 141/346 |
| 4,681,144 | 7/1987 | Horvath et al. | 141/1 |
| 4,881,581 | 11/1989 | Hollerback | 141/98 |
| 5,609,190 | 3/1997 | Anderson et al. | 141/98 |
| 5,634,505 | 6/1997 | Wong | 14/346 |
| 5,638,875 | 6/1997 | Corfitsen | 141/231 |
| 5,671,786 | 9/1997 | Corfitsen | 141/231 |

FOREIGN PATENT DOCUMENTS

| 2929192 | 4/1981 | Germany . |
| 9013512 | 11/1990 | WIPO . |
| 9405592 | 3/1994 | WIPO . |

Primary Examiner—J. Casimer Jacyna
Attorney, Agent, or Firm—Alfred J. Mangels

[57] ABSTRACT

A docking arrangement for the automatic fueling of automotive vehicles, primarily cars, where a robot is provided including a robot head that can be moved in relation to the robot and positioned in relation to an adapter (3), the adapter being arranged for fastening to the upper orifice of the fuel-tank pipe (2) of a vehicle. According to the invention the robot head includes a rearward part (13) and a front part (14) as seen in its axial direction, wherein the rearward part (13) is attached to the robot and the front part (14) is carried by the rearward part (13) with the aid of a spring (15) which enables the front part (14) to be moved from a rest position towards the rearward part (13) and angled relative to the rearward part; in that the front part (14) has an axially forwardly projecting flange (16) which extends along a lower part (17) of the periphery (18) of the front part and which fits on the mantle surface (19) of the adapter (3; 39) and in that when docking the front part (14) with the adapter (3; 39), the flange (16) will lie in abutment with the mantle surface (19) of the adapter, whereby the front part (14) is angled against the spring force at an angle at which the adapter and the front part will lie in abutment with one another.

7 Claims, 5 Drawing Sheets

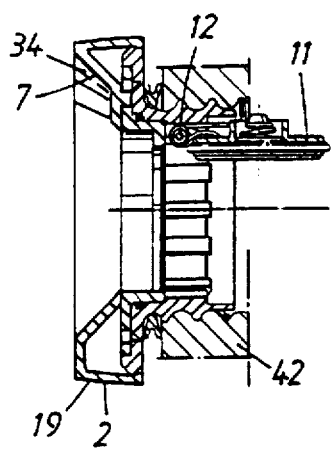
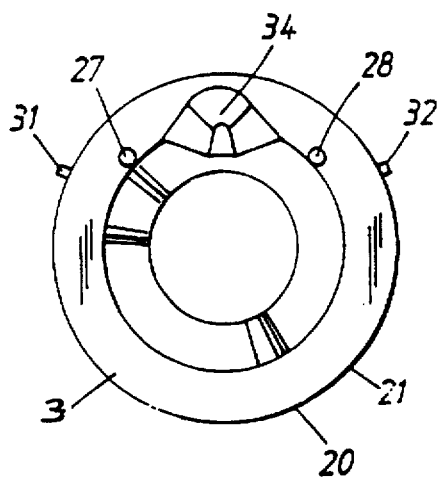
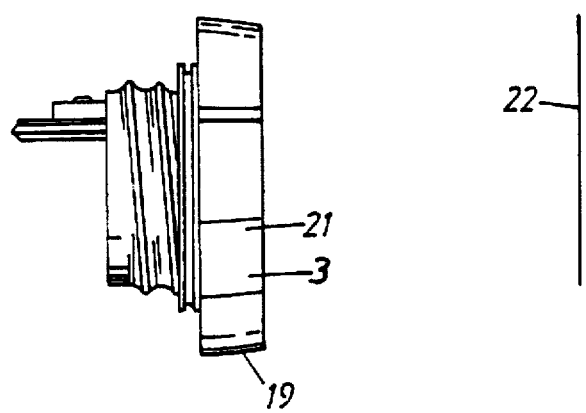

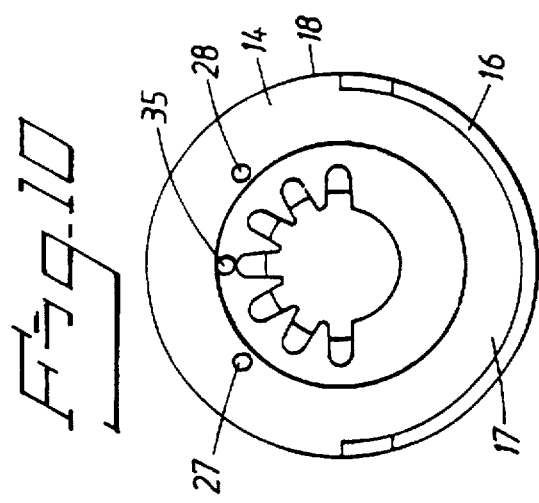
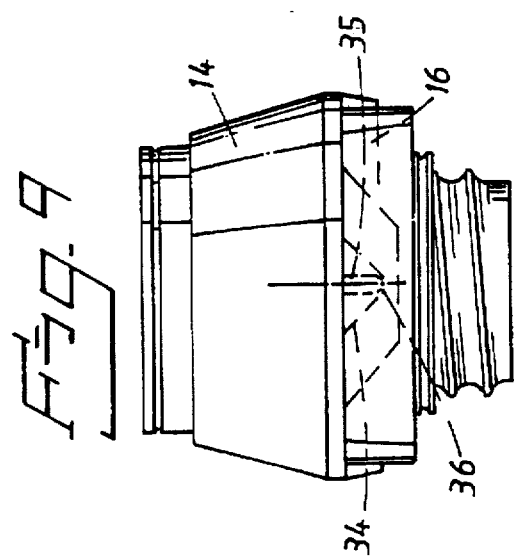
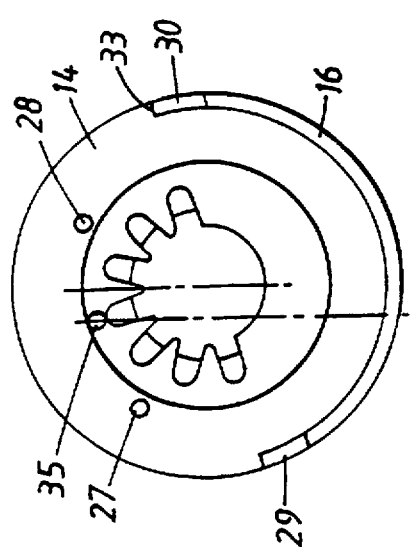
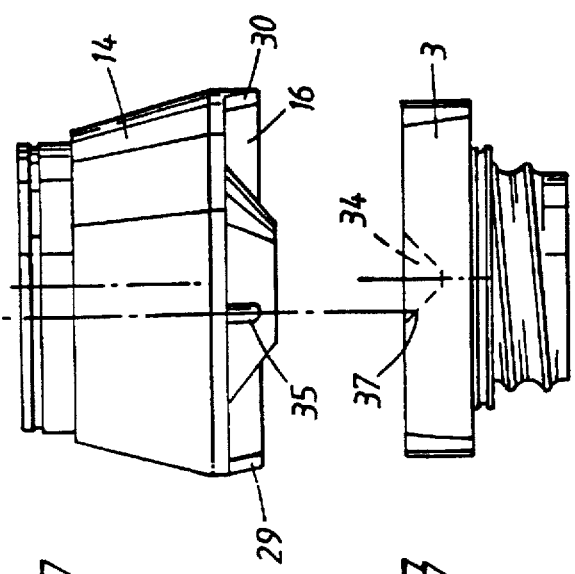

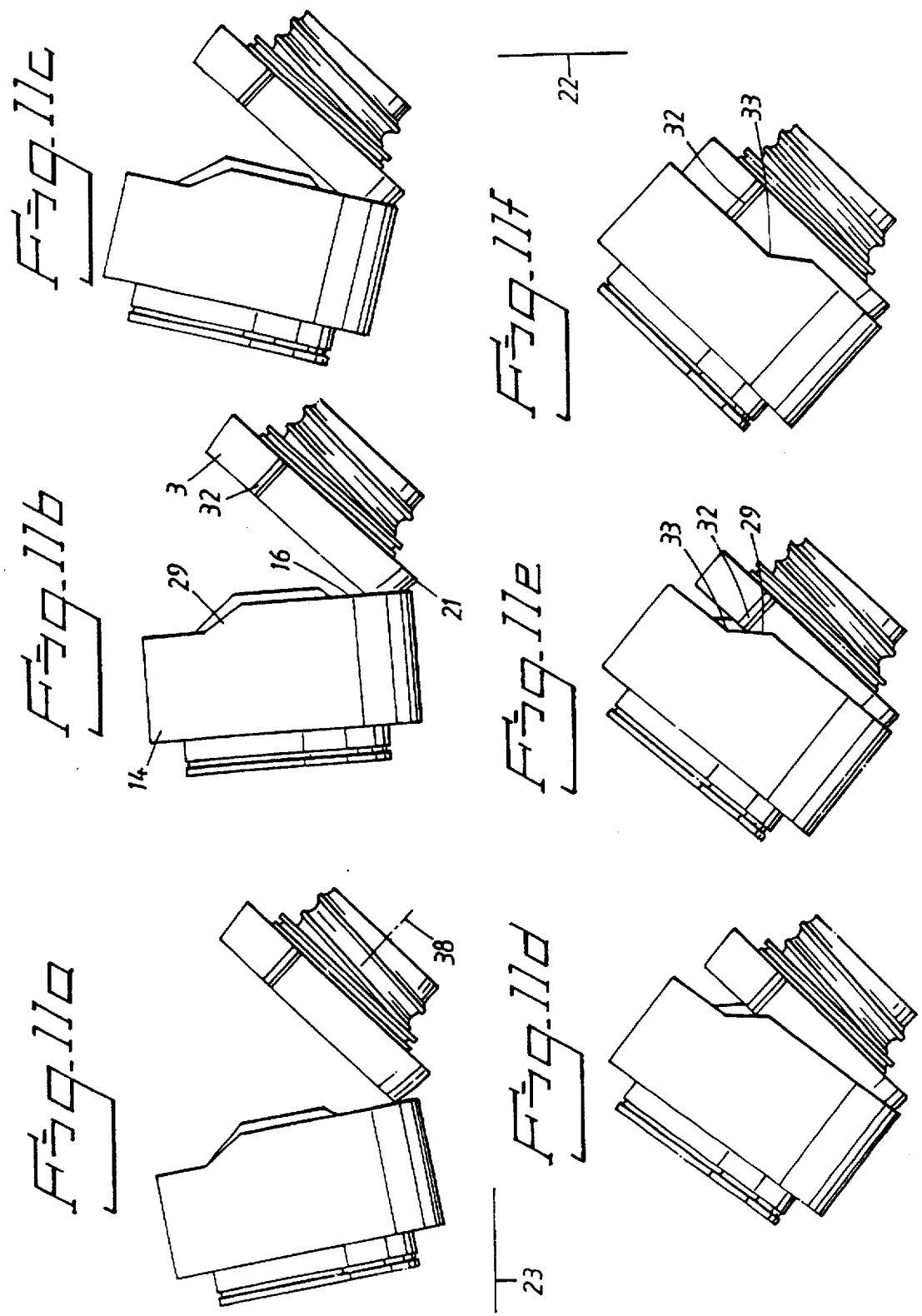

1

ARRANGEMENT FOR DOCKING AT AUTOMATIC FUELLING OF VEHICLES

BACKGROUND OF THE INVENTION

The present invention relates to a docking arrangement for the automatic fueling of automotive vehicles.

Swedish Patent Specification No. 8901674-5 describes apparatus for the automatic refueling of automotive vehicles, primarily cars, in which a robot which includes a robot head having a fueling nozzle or like device is adapted to move the fueling nozzle automatically from a rest position to a vehicle fueling position in response to sensing and control means, subsequent to having placed the vehicle in a predetermined position relative to the robot.

According to that patent specification, the refueling nozzle includes a rigid, first tubular element, preferably a metal tube, which is intended to be moved by the robot to an adapter which is provided with a hole and which is attached to the upper orifice of the vehicle fuel-tank pipe. A flexible second tube, preferably a plastic tube, is arranged within the first rigid tube for movement from a first end position in which the outer, free end of the second tube is located within the first tube, to a second end position in which the second tube projects out from the first tube.

The adapter includes a tube connection between said hole and the vehicle fuel-tank pipe. The robot is constructed to move the free end of the first tube into abutment with or to a position in the immediate vicinity of the adapter in a first step and to move the free end of the second tube out of the first tube and down into said tube connection or down into the fuel-tank pipe of the vehicle in a second step, and to pump fuel through the second tube and down into the fuel tank of the vehicle in a third step.

When refueling of the vehicle is completed, the robot functions to repeat the two first-mentioned steps, but in the reverse order.

The apparatus described in the aforesaid patent publication includes a positioning system in which a transceiver unit operating at microwave frequency is mounted on the robot head, and a passive transponder which is placed in the vehicle in a predetermined position relative to the fuel-tank pipe.

Swedish Patent Specification No. 9202549-3 also describes apparatus for the automatic refueling, including an adapter which is intended to be fitted to the fuel-tank pipe of a vehicle. The adapter has a conical part which is intended to coact with the first pipe but also with the free end of the second pipe when the second pipe is passed down through the adapter into the fuel-tank pipe.

Since the fuel-tank pipe orifices of generally all vehicles define an angle with the vertical plane, it is required with known robot heads that the conical part slopes to a lesser extent in the vertical plane and that it preferably lies in the vertical plane, since the first and second pipes of the robot are moved horizontally towards the vehicle as the robot docks therewith.

The present invention solves the problem caused by the fact that the plane in which the orifice of the fuel-tank pipe of different vehicles lies defines different angles with the vertical plane, with the aid of a special robot head and a special adapter.

SUMMARY OF THE INVENTION

The present invention thus relates to a docking arrangement for the automatic fueling of automotive vehicles, primarily cars, with the aid of a robot which includes a robot head that can be moved in relation to the robot and brought to a predetermined position in relation to the fuel-tank pipe of the vehicle by means of a positioning system, wherein the free front end of the robot head has a frusto-conical portion which is intended to dock with a corresponding conical portion of an adapter during said positioning procedure, said adapter being arranged for fastening to the upper orifice of the fuel-tank pipe, and wherein the robot head includes a tube whose free front end is intended to project out through the robot head to a position down in the fuel-tank pipe when docking is completed, whereafter fuel is delivered through the tube. The invention is characterized in that the robot head includes in generally its axial direction a rearward part and a front part, wherein the rearward part is attached to the robot and the front part is carried by the rearward part with the aid of a spring which enables the front part to be moved from a rest position towards the rearward part and angled relative to said rearward part; in that the front part has an axially and forwardly projecting flange which extends around a lower part of the periphery of the front part; in that the flange has a form such as to fit the mantle surface of the adapter at a lower part of the adapter periphery; in that the conical part of the adapter lies in the vertical plane or defines an angle with said vertical plane such that said part will be directed obliquely upwards when fitted to the fuel-tank pipe; and in that when docking the front part with the adapter, the robot functions to position the front part so that the flange will lie in abutment with said lower part of the mantle surface of the adapter; and in that the robot thereafter functions to move the rearward part in a direction towards the adapter, whereby the front part is angled against said spring force at an angle at which the conical surfaces of the adapter and the front part will lie in abutment with one another.

BRIEF DESCRIPTION OF THE DRAWINGS

The invention will now be described in more detail partly with reference to an exemplifying embodiment thereof shown in the accompanying drawings, in which

FIG. 3 is an axial cross-sectional view of an inventive adapter;

FIG. 4 shows the adapter from the left in FIG. 3;

FIG. 5 is a side view of the adapter shown in FIG. 3;

FIG. 6 is a view of the front part of the robot head from above and shows the robot head in a first position of rotation;

FIG. 7 is a view of the front part of said robot head from beneath in FIG. 6, i.e. shows said front part directly from the front in a first position of rotation;

FIG. 8 is a view of the adapter from above;

FIG. 9 is a view of the front part of the robot head from above and shows the front part in a second position of rotation and docked with the adapter;

FIG. 10 illustrates the front part of the robot head immediately from the front in a second position of rotation;

FIGS. 11a–11f illustrate a docking sequence;

FIG. 13 is a sectional view of the docking sequence shown in FIG. 12a; and

DETAILED DESCRIPTION OF THE INVENTION

Figure 1:
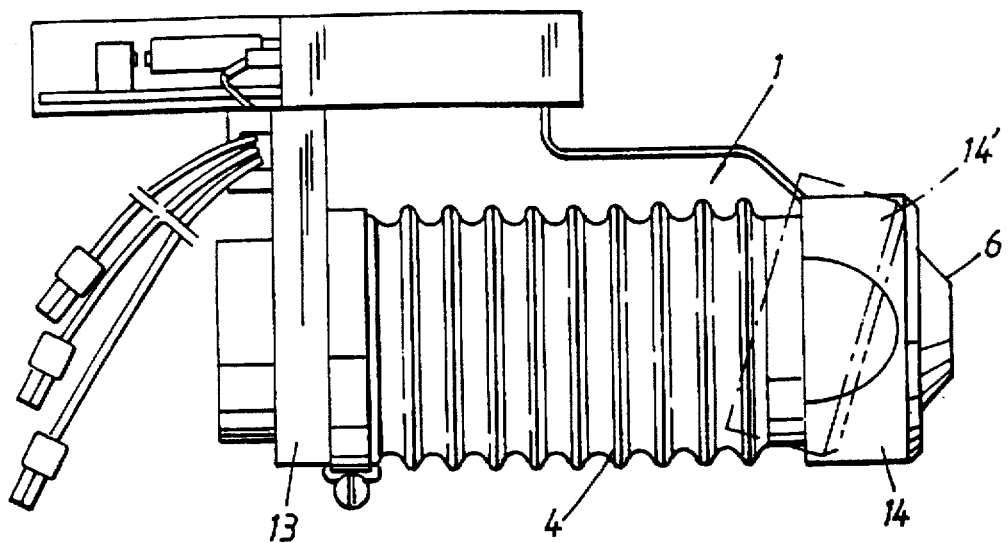
FIG. 1 is a side view of the front part of the robot head.
Figure 2:
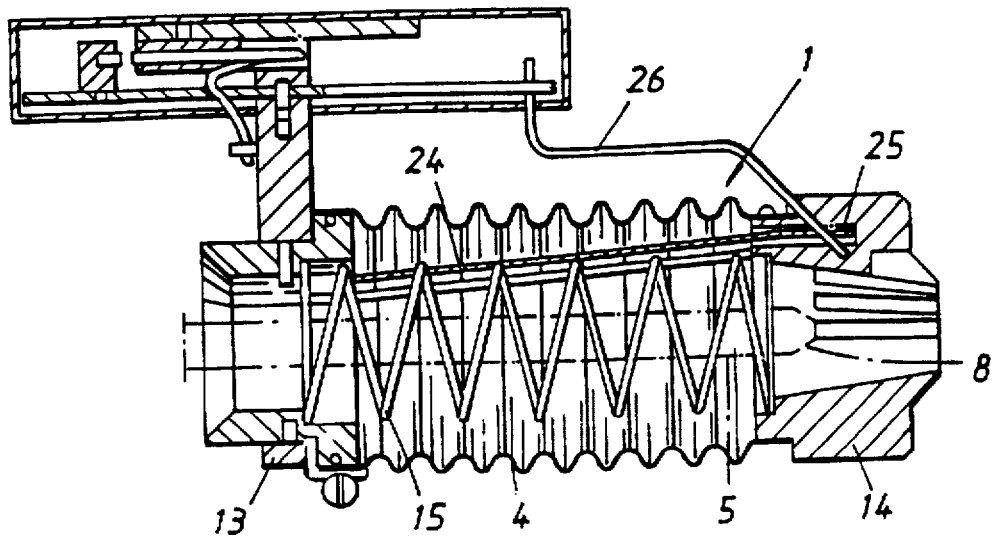
FIG. 2 is a sectional side view of the front part of the robot head.
Figure 14:
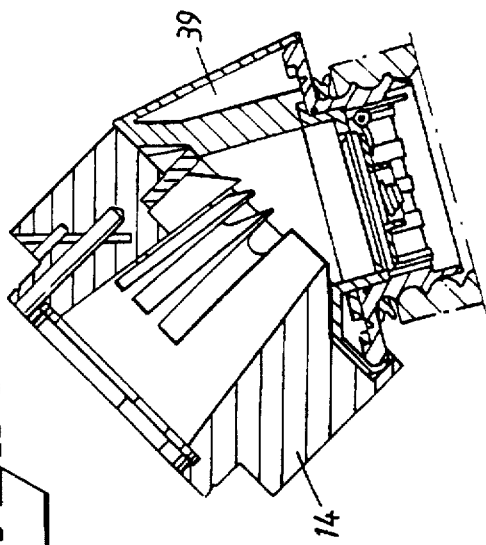
FIG. 14 is a sectional view of the docking sequence shown in FIG. 12c.

FIGS. 1 and 2 are side views of the front part of a robot head 1 in a position prior to docking with an adapter 3 attached to the fuel-tank pipe 42 of the vehicle, see FIGS. 3-5. The robot head belongs to a suitable known robot, not shown. The robot head 1 can be moved relative to the robot and brought to a predetermined position relative to the fuel-tank pipe 42 of the vehicle, or more specifically relative to the adapter 3.

The robot head is positioned relative to the adapter by means of an electronic positioning system which includes a first part located on the robot head and a second part which is placed in a predetermined position on the vehicle. The positioning system is preferably of the kind mentioned in the introduction, where the second part is a passive transponder mounted on the vehicle in the vicinity of or on the vehicle fuel-tank flap. The electronic positioning system, however, is not significant to the present invention.

The robot head includes a fueling nozzle which, in turn, includes a bellows-like outer tube 4 and an inner tube 5 which is able to move into and out of the outer tube 4. The inner tube is shown in broken lines in FIG. 2. The outer tube 4 has at its free front end a frusto-conical part 6 which in the aforesaid positioning operation is intended to dock with a corresponding frusto-conical part 7 belonging to the adapter 3, which is attached to the upper orifice of the fuel-tank pipe. Upon completion of the docking operation, the free front end 8 of the inner tube 5 is intended to project out to a position down in the fuel-tank pipe, whereafter fuel is delivered through the inner tube.

The adapter is preferably provided with a cover 11 pivotally mounted on a shaft 12. FIG. 3 shows the cover in its open position. As the inner tube 5 is extended out of the outer tube 4 and down into the fuel-tank tube 2, the cover is swung forcibly downwards in the pipe 2, against a spring force.

According to the invention, the robot head includes a rear part 13 and a front part 14 which extend generally in the axial direction of the head, wherein the rear part is attached to the robot and the front part 14 is carried by the rear part 13 with the aid of a spring 15 which enables the front part 14 to be moved from a rest position in a direction towards the rear part 13 and angled relative thereto. The front part 14 is shown angled relative to the rear part in broken lines 14' in FIG. 1.

According to one preferred embodiment, the spring 15 is a steel helical spring. It is conceivable, however, to use instead one or more leaf springs or other types of springs that will provide the same function.

The front part 14 has a central through-penetrating hole which receives the inner tube 5 and through which said tube projects when fueling a vehicle. Also the rear part will conveniently have a corresponding through-penetrating hole.

The front part 14 has a flange 16 (not shown in FIGS. 1 and 2) which projects axially forwards and extends along a lower part 17 of the periphery 18 of said front part 14, as can be seen from FIGS. 9 and 10. The flange 16 has a form which fits the mantle surface 19 of the adapter 3 at the lower part 20 of the adapter periphery 21; see FIGS. 3-5.

The conical part 7 of the adapter 3 lies in the vertical plane or defines an angle with the vertical plane such that said part extends obliquely upwards when the adapter is fitted to the fuel-tank pipe, as illustrated in FIG. 11 in which the vertical plane is identified by dash line 22.

When docking the front part 14 with the adapter 3, the robot functions to position the front part 14 such that the flange 16 will come into abutment with the lower part 20 of the mantle surface 21 of the adapter. This position is illustrated in FIGS. 11a and 11b. FIG. 11b shows the front part in abutment with the adapter, such that the bottom edge of the flange 16 is in abutment with the mantle surface 21 of the adapter. This is achieved as a result of the positioning system moving the robot head 1 towards the adapter and moving generally horizontally towards and up to the adapter 3 at the end of said movement.

The robot then functions to move the rear part 13 towards the adapter 3, whereby the front part 14 is angled against the force of said spring 15 such that the conical surfaces of the adapter and the front part are brought into abutment with each other. FIG. 11f illustrates a fully docked state. FIGS. 11a to 11f illustrate the steps of a docking procedure. It will be apparent that because the flange abuts the bottom edge of the adapter, the front part 14 will be angled successively or twisted in over the adapter to the final docking position.

In one preferred embodiment of the invention, the front part 14 of the robot head extends slightly upwards when in its rest position, preferably so that its longitudinal axis will define in said rest position an angle of 5 to 15 degrees with the horizontal plane. This position is shown in FIG. 11a, but not in FIG. 1. The horizontal plane is indicated by the dash line 23. This embodiment affords a somewhat better function in the initial stage of the docking procedure, particularly when the conical part of the adapter lies adjacent to or in the vertical plane, as illustrated in FIG. 5.

In one preferred embodiment of this latter feature, a wire 24 or like element extends between the rear part 13 and the upper part 25 of the front part 14, as shown in FIG. 2. The length of the wire 24 is such as to tilt the front part 14 upwards slightly, through the action of the spring force.

The illustrated element 26 does not function to support the front part 14, but belongs to a safety device.

The hitherto described arrangement thus enables the conical part of the adapter to define an angle of essentially any desired size with the vertical plane. Tests have shown that the conical part of the adapter can define an angle from 0 degrees, see FIG. 5, up to about 75 degrees to the vertical plane while still achieving a successful docking operation.

The present invention thus solves the problem mentioned in the introduction, which means that generally all vehicles can be provided with one and the same adapter despite the angle at which the vehicle fuel-tank pipe slopes to the horizontal plane varying markedly from vehicle to vehicle.

Figure 13:
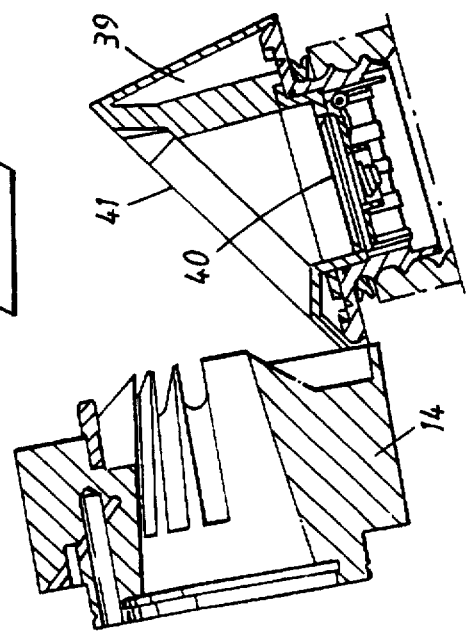
Figure 12C:
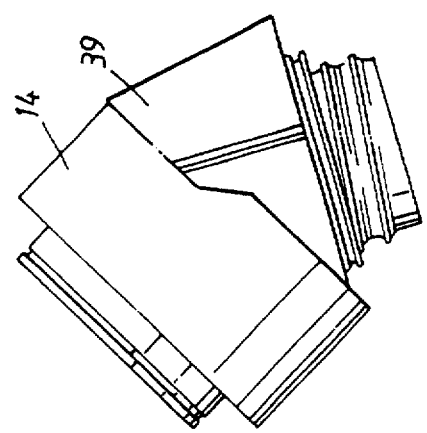
FIGS. 12a–12c illustrate a docking sequence.
Figure 12B:
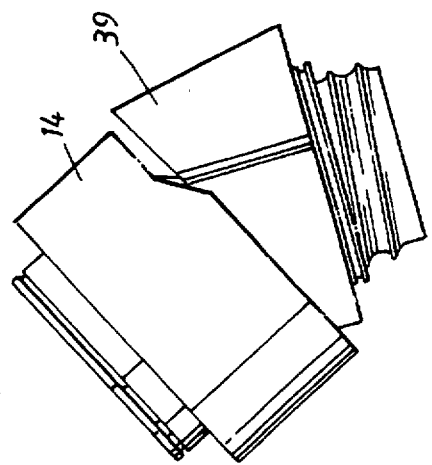
Figure 12A:
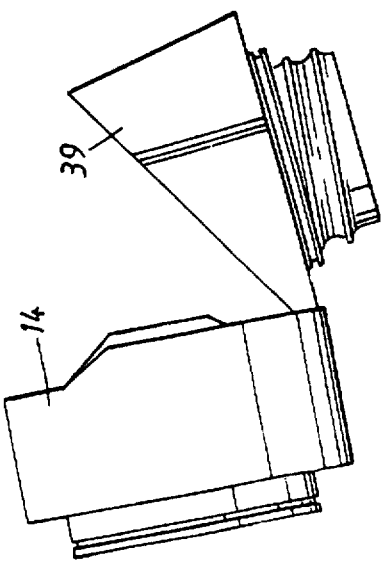

Although the arrangement is effective in managing the aforesaid wide angular range, it is not preferred to use one and the same adapter with vehicles whose fuel-tank pipe angles vary markedly from vehicle to vehicle. FIGS. 11a–11f illustrate a perfectly straight adapter, i.e. an adapter whose upper orifice or opening lies in a plane parallel with its lower opening or orifice. This adapter is intended for an angular range in which the axis of the fuel-tank pipe defines an angle in the range of 0 degrees and approximately 45 degrees to the horizontal plane. When the fuel-tank pipe defines a greater angle with the horizontal plane, such as in the case shown in FIGS. 12a–12c, there is conveniently used an adapter 39 which is constructed so that the plane of its lower opening 40 will define an angle with the plane of its upper opening 41, see FIG. 13, with the intention of reducing the angle of the plane of the upper opening to the vertical plane. Such an adapter 39 can be used in an angular range in which the axis of the fuel-tank pipe defines with the horizontal plane an angle that lies in the range of about 30 degrees and approximately 75 degrees.

However, the front part 14 is not positioned rotationally by means of the embodiment described hitherto. In certain cases, there is namely a need to position the front part in a precise position relative to the adapter, where the front part is also in a correct position of rotation around its longitudinal axis in relation to the adapter. This need occurs when sensors 27, 28 (see FIG. 7) are provided on the conical part of the adapter and corresponding parts of the sensors are provided on the front part.

These sensors may be of an inductive kind, for instance, and may contain information relating to the type of fuel used to refuel the vehicle, this information being transferred to the sensor part in the front part 14. The sensors also confirm that docking has been effected correctly.

In one preferred embodiment, the flange 16 includes to this end a bevelled part 29, 30 at both ends of thereof, these bevelled parts forming guide surfaces as shown in FIGS. 6, 7 and 11b. The guide surfaces are intended to coact with guide pins or guide strips 31, 32 that project out on the adapter 3, see FIGS. 4, 11b and 11e. The position of the guide strips is such that when docking has taken place, the guide strips 31, 32 will extend perpendicularly to the flange 16 and be located at the junction 33 between the bevelled parts and the forwardly facing surface of the front part, or slightly to one side of said junction, see FIGS. 7 and 11f.

If the front part is incorrectly positioned in relation to the adapter, as illustrated in FIG. 7 (FIG. 10 shows the correct rotational position), one of the guide surfaces 29, 30 will come into contact with one of the guide strips 31, 32, as illustrated in FIG. 11d. In this case, when the front part 14 is pressed forwards against the adapter, the front part will turn as a result of the guide surface on one side of said front part sliding in relation to a guide strip 32. This will be apparent when comparing FIGS. 11d with FIG. 11e.

FIG. 11f shows that the front part has been further rotated due to abutment of the guide strip 32 with the junction 33. This further rotation has not been achieved through the influence of the guide surfaces and the guide strips.

This further rotation from the position in which the guide strip 32 abuts the junction 33 to the position shown in FIG. 11f is effected in accordance with a preferred embodiment of the front part 14 and the adapter 3, as described below.

In this embodiment, the surface of the conical part 7 of the adapter 3 has an essentially V-shaped recess 34, see FIGS. 3, 4 and 8. This recess is intended for coaction with a member 35 which projects forwardly from the front part 14, see FIGS. 6, 7, 9 and 10. This member suitably has the form of a steel pin. The member 35 is positioned so that when docking is completed (see FIG. 9), the tip of the member will be located in the pointed bottom 36 of the V-shaped recess.

Thus, upon initial rotation by means of the guide surfaces and guide strips, the tip of the member 35 will come into contact with the recess 34, with the tip of the member engaging the walls of the recess, for instance at point 37 in FIGS. 6, 7, and slides against the walls of the recess while the front part 14 is rotated until the tip of the member 35 reaches the bottom of the recess, as illustrated in FIG. 9.

In this latter position, the front part has been rotated precisely so as to be positioned correctly rotationally in relation to the adapter.

Naturally, the member 35 and the recess 34 can be omitted and solely guide surfaces and guide strips used, or alternatively the guide surfaces and guide strips can be omitted and solely the member 35 and the recess 34 used, depending on the degree of accuracy required when rotating-in the front part 14, and the accuracy of the rotational position of the front part 14 in the initial phase of the docking procedure.

Depending on requirements, the aforesaid flange may extend along a shorter or a longer part of the peripheral length of the front part. In one preferred embodiment, the flange 16 extends arcuately around the periphery of the front part and contains an angle of arc which lies in a range between 45 and 270 degrees around said periphery.

Exemplifying embodiments have been described in the afore-going. It will be understood, however, that the detail construction of the front part 14 and the adapter can be varied without departing from the intended function of these components. For instance, the flange need not be a continuous structure but may instead be replaced with a number of mutually adjacent and mutually spaced outwardly projecting flange sections.

The present invention shall not therefore be considered to be limited to the aforedescribed exemplifying embodiments thereof, since modifications and variations can be made within the scope of the following Claims.

I claim:

1. A docking arrangement for the automatic fuelling of an automotive vehicle with the aid of a robot comprising a robot head having a rearward part adapted to be attached to a robot and a front part, spring means resiliently mounting said front part from said rearward part and permitting said front part to move from a rest position towards said rearward part and to angularly adjust relative to said rearward part, an adapter adapted for connection to a fuel tank pipe of a vehicle, said front part of said robot head and said adapter having cooperating conical surfaces which facilitate docking therebetween, said front part having an axially forward projecting flange extending around its lower peripheral portion and conformed to fit on the lower peripheral surface of said adapter, the conical surface of said adapter lying in a vertical plane such that it will be directed obliquely upwards when said adapter is connected to a fuel tank pipe, whereby said robot head is moved by a robot to a docking position with said adapter said flange abuts the lower peripheral surface of said adapter and said front part automatically adjusts against the force of said spring means so that said cooperating conical surface of said front part and said adapter abut one another.

2. An arrangement according to claim 1, wherein said spring means (15) is a helical spring.

3. An arrangement according to claim 1, wherein said front part (14) extends slightly upwards in its rest position.

4. An arrangement according to claim 3, comprising a wire (24) extending between the rear part (13) and the upper part (25) of the front part (14), wherein the length of the wire is such that when the front part (14) is in its rest position, said front part will extend slightly upwards under the influence of said spring force.

5. An arrangement according to claim 1, wherein both ends of said flange (16) are bevelled (29, 30) such as to provide guide surfaces for coaction with guide means (31, 32) which project out on said adapter (3; 39) and which are so positioned that when docking has taken place, the guide means will extend perpendicular to the flange (16) and be located at the junction (33) between the bevelled ends (29, 30) and the forwardly facing surface of the front part (14) or slightly to one side of said junction.

6. An arrangement according to claim 1, wherein the conical surface of the adapter (3) includes an essentially V-shaped recess (34) intended for coaction with a member

(35) which projects out forwardly from the front part (14), said member being positioned so that when docking the tip of the member (35) will be located in the bottom of the V-shaped recess (34).

7. An arrangement according to claim 1, wherein the flange (16) extends arcuately around the periphery of the front part and contains an angle of arc in a range of between 45 and 270 degrees around said periphery.

\* \* \* \* \*